(12) United States Patent
Buckby

(10) Patent No.: US 10,775,843 B2
(45) Date of Patent: Sep. 15, 2020

(54) MACHINE AND METHOD FOR ITS OPERATION

(71) Applicant: Videojet Technologies Inc., Wood Dale, IL (US)

(72) Inventor: Steven John Buckby, Bleasby (GB)

(73) Assignee: VIDEOJET TECHNOLOGIES INC., Wood Dale, IL (US)

( * ) Notice: Subject to any disclaimer, the term of this patent is extended or adjusted under 35 U.S.C. 154(b) by 0 days.

(21) Appl. No.: 15/748,230

(22) PCT Filed: Jul. 21, 2016

(86) PCT No.: PCT/EP2016/067461
§ 371 (c)(1),
(2) Date: Jan. 29, 2018

(87) PCT Pub. No.: WO2017/016989
PCT Pub. Date: Feb. 2, 2017

(65) Prior Publication Data
US 2018/0217634 A1    Aug. 2, 2018

(30) Foreign Application Priority Data

Jul. 29, 2015 (GB) .................................. 1513371.3

(51) Int. Cl.
*G06F 1/16* (2006.01)
*G06F 3/0481* (2013.01)

(52) U.S. Cl.
CPC .......... *G06F 1/1626* (2013.01); *G06F 1/1637* (2013.01); *G06F 1/1694* (2013.01);
(Continued)

(58) Field of Classification Search
CPC ........ G09G 5/00; G09G 5/36; G09G 2354/00; G09G 2360/144; G09G 3/20;
(Continued)

(56) References Cited

U.S. PATENT DOCUMENTS 5,661,632 A * 8/1997 Register ................ G06F 1/1626
345/905
2009/0300537 A1* 12/2009 Park ........................ G01S 19/14
715/778

(Continued)

FOREIGN PATENT DOCUMENTS

EP    1926075 A2    5/2008

*Primary Examiner* — Olga V Merkoulova
(74) *Attorney, Agent, or Firm* — Beusse, Wolter, Sanks & Maire PLLC; Robert L. Wolter

(57) ABSTRACT

This application concerns an apparatus comprising a housing arranged to be positioned at any one of a plurality of rotational angles, a display mounted to the housing and a processor arranged to execute instructions stored in a memory. The instructions are arranged to cause a user interface to be displayed on the display, to receive an indication of a rotation amount and rotation direction from a rotation input, rotate at least one corner element about its centre point by the rotation amount in the rotation direction and if the rotation amount is greater than a first predetermined limit, move the at least one corner element to a different one of a plurality of corner portions of the display.

20 Claims, 10 Drawing Sheets

(52) U.S. Cl.
CPC .. *G06F 3/04817* (2013.01); *G06F 2200/1614* (2013.01); *G06F 2200/1637* (2013.01)

(58) Field of Classification Search
CPC .. G09G 2320/0626; G09G 5/377; G09G 5/38; G09G 2330/021
See application file for complete search history.

(56) References Cited

U.S. PATENT DOCUMENTS

| | | | |
|---|---|---|---|
| 2010/0317332 A1* | 12/2010 | Bathiche | H04B 1/202 455/418 |
| 2011/0164056 A1* | 7/2011 | Ording | G06F 1/1694 345/649 |
| 2012/0299964 A1* | 11/2012 | Homma | G06F 3/02 345/649 |
| 2013/0328935 A1* | 12/2013 | Tu | G06F 1/1694 345/651 |
| 2014/0009499 A1* | 1/2014 | Gardenfors | G09G 5/363 345/656 |
| 2014/0365913 A1* | 12/2014 | Santamaria | G06F 3/0414 715/748 |
| 2015/0169080 A1* | 6/2015 | Choi | G06F 3/0488 345/174 |

* cited by examiner

MACHINE AND METHOD FOR ITS OPERATION

The present invention relates to configurable apparatuses which may be utilised by a user in each of a plurality of orientations. Examples of such apparatuses are industrial labelling machines and printing machines. Such apparatuses may be provided with a controller by which a user can control the apparatus. Reorientation of the apparatus, for integration with an existing production line for example, may result in the controller becoming difficult to use, thereby reducing the efficiency of the apparatus.

It is therefore desired to provide configurable apparatuses and methods for their use, which allow for efficient control in any of the orientations in which the apparatuses may be used.

According to a first aspect of the present invention, there is provided an apparatus including a housing arranged to be positioned at any one of a plurality of rotational angles. For example, the apparatus may be a printer or a labelling machine which can be orientated to fit within an existing production line. The apparatus further includes a display. The display is mounted to the housing. In some embodiments, the display may be mounted to the housing in such a way that the rotation of the display with respect to the housing is restricted. For example, in some embodiments, the display cannot be rotated through a full three-hundred and sixty degrees. In some embodiments, the display may be substantially non-rotatable with respect to the housing and may be immovably fixed to the housing such that the display cannot be substantially (i.e. so as to significantly affect the orientation of the display with respect to the housing) moved relative to the housing during normal use. The apparatus further includes a processor arranged to execute instructions stored in a memory. The instructions are arranged to cause a user interface to be displayed on the display. The user interface includes at least one corner element positioned in one of a plurality of corner portions of the display. The at least one corner element has a centre point. The instructions are further arranged to cause an indication of a rotation amount and rotation direction to be received from a rotation input and to rotate the at least one corner element about its centre point by the rotation amount in the rotation direction, and if the rotation amount is greater than a first predetermined limit, move the at least one corner element to a different one of the plurality of corner portions of the display.

In this way, the apparatus includes a user interface which may be adjusted such that the elements of the user interface are "upright" and additionally in a desired relative configuration, despite the orientation of the apparatus. Further, the re-orientation may be achieved with a simple rotation instruction and without requiring the display to be movably mounted to the apparatus.

According to a second aspect of the invention, there is provided non-transitory computer-readable medium carrying computer readable instructions arranged to cause a processor to cause a user interface to be displayed on a display. The user interface comprises at least one corner element positioned in one of a plurality of corner portions of the display and having a centre point. The instructions are further arranged to cause receipt of an indication of a rotation amount and rotation direction from a rotation input, the at least one corner element about the centre point by the rotation amount in the rotation direction, and if the rotation amount is greater than a first predetermined limit, move the at least one corner element to a different one of the plurality of corner portions of the display Moving the at least one corner element may comprise moving the at least one corner element by a single corner portion in the rotation direction. For example, the at least one corner element may be moved to an immediately adjacent corner portion in the rotation direction.

The instructions may further be arranged to, if the rotation amount is greater than a second predetermined limit, move the at least one corner element by two corner portions in the rotation direction. For example, the at least one corner element may be moved by two immediately adjacent corner portions in the rotation direction. The second predetermined limit may be greater than the first predetermined limit in the rotation direction.

The instructions may further be arranged to, if the rotation is amount is greater than a third predetermined limit move the at least one corner element by three corner portions in the rotation direction. For example, the at least one corner element may be moved by three immediately adjacent corner portions in the rotation direction. The third predetermined limit may be greater than the first predetermined limit in the rotation direction. The third predetermined limit may be greater than the second predetermined limit in the rotation direction.

The instructions may further be arranged to, if the rotation amount is greater than a fourth predetermined limit, determine that the at least one corner element is to remain at the current corner portion. The fourth predetermined limit may be greater than the first predetermined limit in the rotation direction. The fourth predetermined limit may be greater than the third predetermined limit in the rotation direction. The fourth predetermined limit may be greater than the second predetermined limit.

The user interface may comprise first to fourth corner elements each positioned in a respective one of first to fourth corner portions of the display, and each having a respective centre point. The instructions may be arranged to, if the rotation amount is greater than a first predetermined limit, move each of the first to fourth corner elements to a different respective one of the first to fourth corner portions of the display.

The instructions may be arranged to, if the rotation amount is greater than a first predetermined limit, move each of the first to fourth corner elements by a single corner portion in the rotation direction.

The instructions may further be arranged to, if the rotation amount is greater than a second predetermined limit, move each of the first to fourth corner elements by two corner portions in the rotation direction. The second predetermined limit may be greater than the first predetermined limit in the rotation direction. In this way, additional flexibility is provided for re-configuring the relative positions of the corner elements of the user interface.

The instructions may further be arranged to, if the rotation is amount is greater than a third predetermined limit move each of the first to fourth corner elements by three corner portions in the rotation direction. The third predetermined limit may be greater than the first predetermined limit in the rotation direction, and may additionally or alternatively be greater than the second predetermined limit in the rotation direction. In this way, additional flexibility is provided for re-configuring the relative positions of the corner elements of the user interface.

The instructions may further be arranged to, if the rotation amount is greater than a fourth predetermined limit, determine that the corner elements are to remain in their current corner portions. The fourth predetermined limit may be greater than any or all of the first, second and third predetermined limits in the rotation direction. In this way, if rotation of the user interface exceeds the fourth predetermined limit, no re-configuring of the relative positions of the user interface elements need occur, thereby efficiently maintaining the existing relative positions of the user interface elements.

The rotation input may include a dial, which may provide a particularly effective means for providing the indication of a rotation amount and direction.

The instructions may further be arranged to determine whether selection of a re-orientation facility has been received and to prevent re-orientation of the user interface until a selection of the re-orientation facility has been received. In this way, user input devices may be used both for providing indications of a rotation amount and direction, and for general navigation/selection purposes within the user interface. For example, the instructions may further be arranged to activate the rotation input in response to receipt of a selection of the re-orientation facility has been received.

The display may be a rectangular display, for which embodiments described herein may be particularly effective. For example, aspects of the invention may allow a rectangular display to be used in place of a more expensive circular display.

The user interface may further comprise a central element positioned in a central portion of the display, and the instructions may be arranged to rotate the central element about a central element centre point by the rotation amount in the rotation direction in response to receiving the indication of a rotation instruction and rotation direction.

According to a third aspect of the invention, there is provided a method for re-orientating a user interface comprising at least one corner element, the at least one corner element positioned in one of a plurality of corner portions of the display and having a centre point. The method comprises receiving an indication of a rotation amount and rotation direction from a rotation input, rotating the at least one corner element about the centre point by the rotation amount in the rotation direction, and if the rotation amount is greater than a first predetermined limit, moving the at least one corner element to a different respective one of the first to fourth plurality of corner portions of the display.

Moving the at least one corner element may comprise moving the at least one corner element by a single corner portion in the rotation direction.

The method may further comprise, if the rotation amount is greater than a second predetermined limit, moving the at least one corner element by two corner portions in the rotation direction. The second predetermined limit may be greater than the first predetermined limit in the rotation direction.

The method may further comprise, if the rotation is amount is greater than a third predetermined limit moving the at least one corner element by three corner portions in the rotation direction. The third predetermined limit may be greater than the first predetermined limit in the rotation direction. The third predetermined limit may be greater than the second predetermined limit in the rotation direction.

The method may further comprise, if the rotation amount is greater than a fourth predetermined limit, determining that the at least one corner element is to remain at the current corner portion. The fourth predetermined limit may be greater than the first predetermined limit in the rotation direction. The fourth predetermined limit may be greater than the third predetermined limit in the rotation direction. The fourth predetermined limit may be greater than the second predetermined limit.

The user interface may comprise first to fourth corner elements each positioned in a respective one of first to fourth corner portions of the display, and each having a respective centre point. The method may further comprise, if the rotation amount is greater than a first predetermined limit, moving each of the first to fourth corner elements to a different respective one of the first to fourth corner portions of the display.

The method may further comprise, if the rotation amount is greater than a second predetermined limit, moving each of the first to fourth corner elements by two corner portions in the rotation direction. The second predetermined limit may be greater than the first predetermined limit in the rotation direction. In this way, additional flexibility is provided for re-configuring the relative positions of the corner elements of the user interface.

The method may further comprise, if the rotation is amount is greater than a third predetermined limit moving each of the first to fourth corner elements by three corner portions in the rotation direction. The third predetermined limit may be greater than the first predetermined limit in the rotation direction, and may additionally or alternatively be greater than the second predetermined limit in the rotation direction. In this way, additional flexibility is provided for re-configuring the relative positions of the corner elements of the user interface.

The method may further comprise, if the rotation amount is greater than a fourth predetermined limit, determining that the corner elements are to remain in their current corner portions. The fourth predetermined limit may be greater than any or all of the first, second and third predetermined limits in the rotation direction. In this way, if rotation of the user interface exceeds the fourth predetermined limit, no re-configuring of the relative positions of the user interface elements need occur, thereby efficiently maintaining the existing relative positions of the user interface elements.

Receiving the rotation input may comprise receiving the rotation input from a dial.

The method may further be arranged to determine whether selection of a re-orientation facility has been received and to prevent re-orientation of the user interface until a selection of the re-orientation facility has been received. In this way, user input devices may be used both for providing indications of a rotation amount and direction, and for general navigation/selection purposes within the user interface. For example, the instructions may further be arranged to activate the rotation input in response to receipt of a selection of the re-orientation facility has been received.

The user interface may further comprise a central element positioned in a central portion of the display, and the method may further comprise rotating the central element about a central element centre point by the rotation amount in the rotation direction in response to receiving the indication of a rotation instruction and rotation direction.

Where features have been described above in the context of one aspect of the invention, it will be appreciated that where appropriate such features may be applied to other aspects of the invention. Indeed, any of the features described above and elsewhere herein can be combined in any operative combination and such combination is expressly foreseen in the present disclosure.

To the extent appropriate, control methods described herein may be implemented by way of suitable computer programs and as such computer programs comprising processor readable instructions arranged to cause a processor to execute such control methods are provided. Such computer programs may be carried on any appropriate carrier medium (which may be a tangible or non-tangible carrier medium).

Specific embodiments of the present invention will now be described, by way of example only, with reference to the accompanying drawings, in which.

Figure 1:
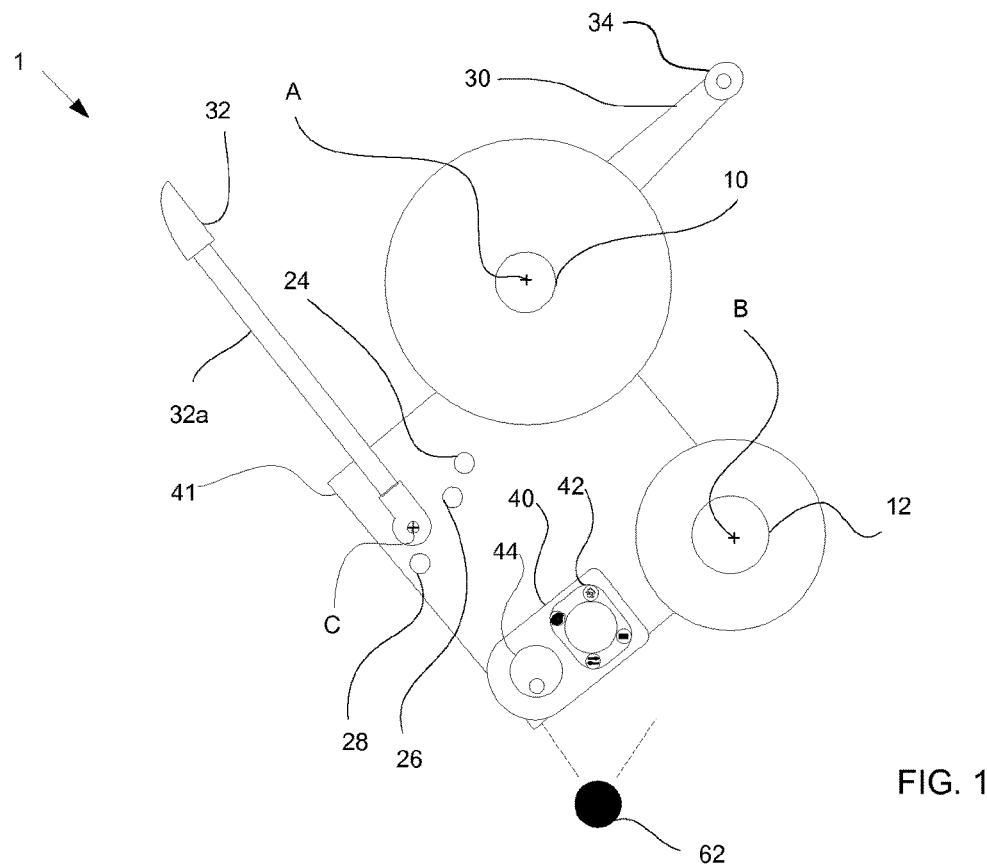
FIG. 1 is a schematic top view of a portion of a labelling machine in accordance with an embodiment of the invention.

FIG. 1 depicts a schematic top view of portions of an apparatus, in accordance with an exemplary embodiment described herein. In particular, FIG. 1 depicts a labelling machine 1, and more particularly a type of labelling machine sometimes referred to as a label applicator. However, while a labelling machine is depicted and is described herein, it is to be understood that the invention is not limited thereto, and that the invention is applicable to other apparatuses, such as industrial printers, for example.

The labelling machine 1 includes a supply spool support 10 and a take up spool support 12 arranged to rotate around axes A and B respectively. The take up spool support 12 is connected to a motor (not shown) such that the motor can be powered in order to rotate the take up spool support 12 about the axis B. In the labelling machine 1 shown in FIG. 1, the motor is connected to the take up spool support 12 via a belt (not shown).

In use, label stock extends between the supply spool support 10 and the take up spool support 12. First, second and third (24, 26 and 28) define a web path (not shown) between the supply spool support 10 and take up spool support 12. It will be appreciated that in other embodiments of the labelling machine 1, components other than rollers may be used to define the web path. Suitable components may be those which impart only a small friction force to label stock when label stock contacts it.

The web path is also defined by a dancing arm 30 and a label applicator assembly 32. The dancing arm 30 includes a dancing arm roller 34 mounted at one end of the dancing arm 30.

In use, the label stock extends along the web path from the supply spool support 10 around the dancing arm roller 34, around the first roller 24, around the second roller 26, around the label applicator assembly 32, around the third roller 28 and is wound onto the take up spool support 12 to form a take up spool.

It will be appreciated that in other embodiments of a labelling machine according to the invention any appropriate number of rollers (or any other appropriate components) may be used to define a desired shape/length of web path.

The dancing arm 30 is a movable element which is rotatable about the axis A. That is to say, in the labelling machine 1 shown in FIG. 1, the axis of rotation of the dancing arm 30 is coaxial with the axis of rotation of the supply spool support 10. In other embodiments this need not be the case. For example, the dancing arm 30 may rotate about an axis which is spaced from the axis A of rotation of the supply spool support 10.

It will also be appreciated that in the labelling machine 1 shown in FIG. 1, the dancing arm 30 is a movable element which defines the web path and movement of the dancing arm 30 changes the length of the web path between the supply spool support 10 and take up spool support 12. It will be appreciated that in other labelling machines any other appropriate movable element may be used, providing that movement of the movable element changes the length of the web path between the supply spool support and take up spool support. Other labelling machines according to the present invention may not incorporate a movable element of this sort.

The label stock which is used by labelling machine 1 shown in FIG. 1 comprises a web and a plurality of labels attached to the web. The labels attached to the web are separable from the web.

The label applicator assembly 32 is located at one end of an applicator arm 32a, the other end of which is secured to a housing 41 of the labelling machine 1 via an arm holder 32b. The label applicator arm 32a is a movable element, which is rotatable about an axis C.

Figure 2A:
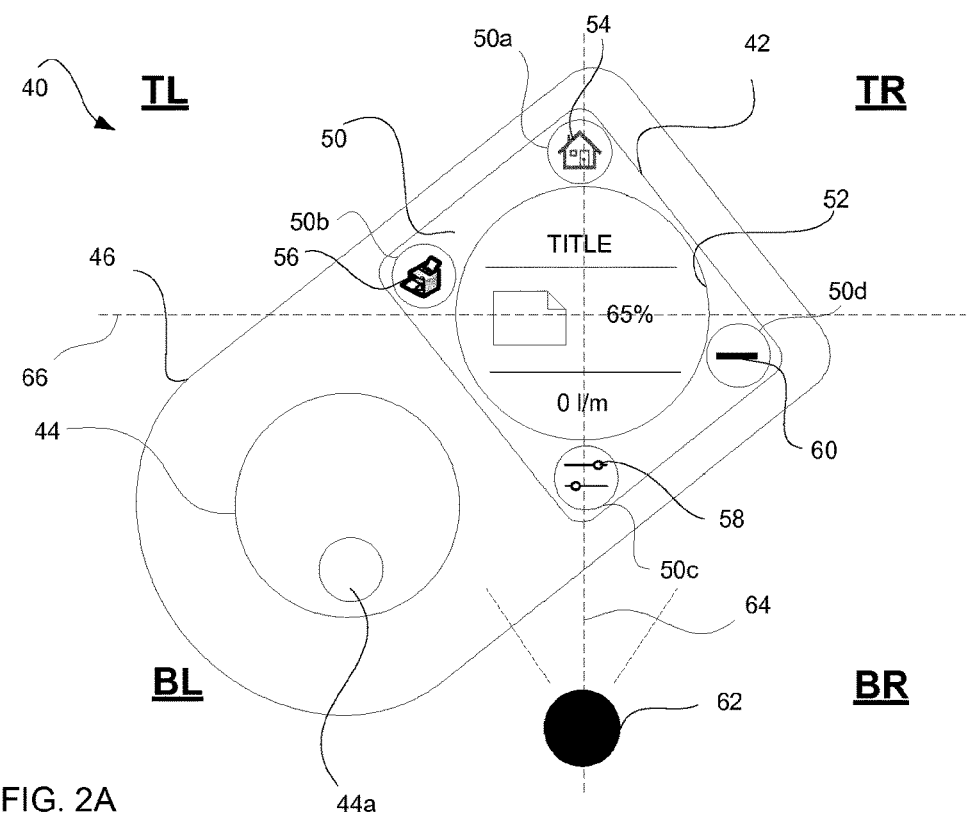
FIGS. 2A, 2B are schematic illustrations of a controller of the labelling machine of FIG. 1.

A controller 40 is attached to the housing 41 of the labelling machine 1. In the presently described example, the controller 40 is immovably attached to the housing 41, such that the controller cannot be substantially rotated with respect to the housing. In other embodiments, however, the controller 40 may be mounted to the housing in such a way that rotation is possible. To reduce costs, where rotation is possible, it may be that rotation of the controller 40 is restricted with respect to the housing 41. The controller 40 includes a rectangular display 42. The rectangular display 42 is arranged to display a user interface 50 (FIG. 2A). The display 42 may be a touchscreen to allow a user to interact with the displayed user interface. Alternatively or additionally, other input means may be provided. In the depicted embodiment the controller 40 also includes an input device in the form of a rotatable dial 44. As will be described in more detail below, the rotatable dial 44 allows a user to manipulate an orientation of the user interface displayed on the display 42. It will be appreciated that where provided, the rotatable dial 44 may additionally provide a means for interacting (e.g. making selections, navigating, etc.) with the user interface.

The movability of the dancing arm 30 and the label applicator arm 32a allows the labelling machine 1 of FIG. 1 to be arranged in any of a plurality of orientations (e.g. so as to be accommodated in an existing manufacturing assembly). As such, the labelling machine 1, and therefore the display 42, may be in any of a plurality of orientations with respect to a location of a user operating the labelling machine 1. To improve control of the labelling machine 1, the controller 40 facilitates efficient manipulation of the user interface as will now be described.

Figure 2B:
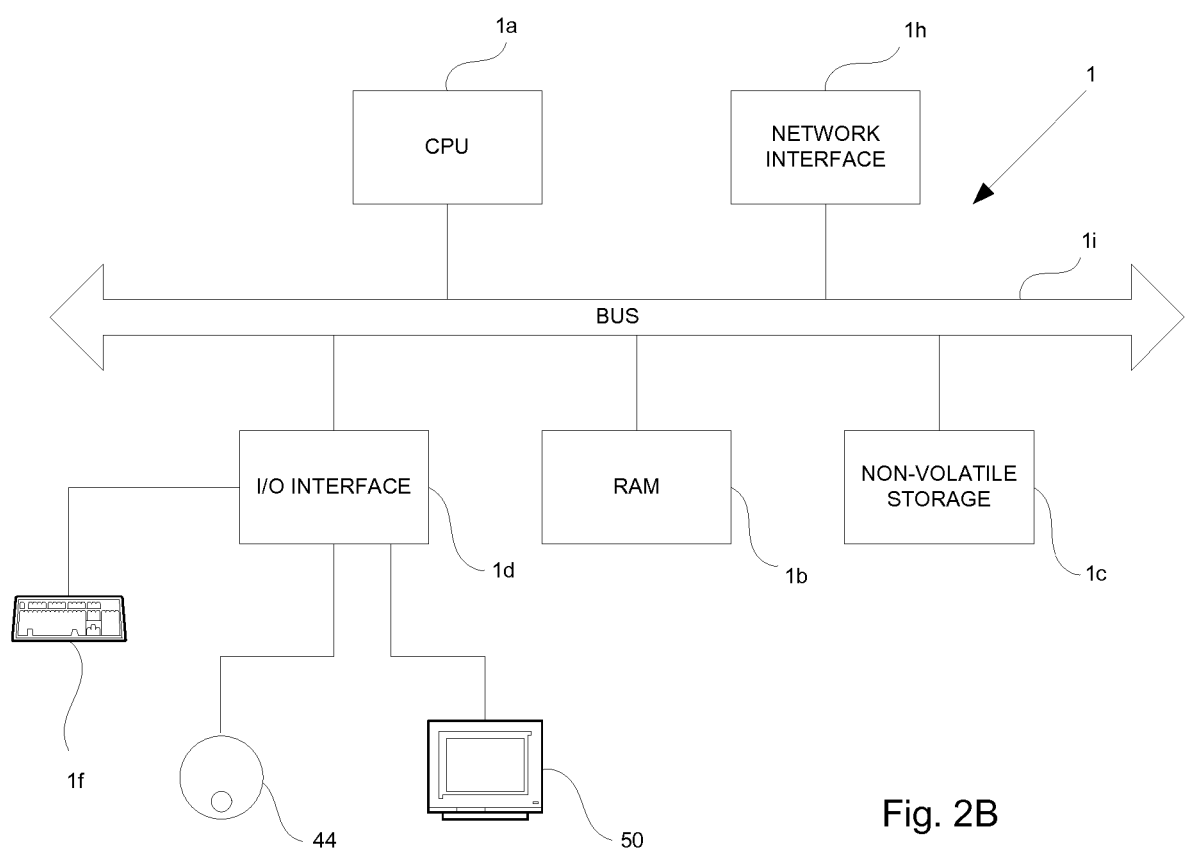

FIGS. 2A, 2B schematically illustrate features of the controller 40 in more detail. FIG. 2A depicts various externally visible features of the controller 40 including a controller housing 46, the display 42 and the dial 44. The dial 44 depicted in FIG. 2A comprises a knob 44a disposed adjacent an edge (i.e. off-centre) of the dial 44 in order to facilitate rotation of the dial by a user. It will be appreciated, however, that neither the dial 44, nor the knob 44a need be present in every embodiment.

A user interface 50 presented on the display 42 may be seen in more detail in FIG. 2A. The user interface 50 is made up of five elements: a central element 52 and first to fourth corner elements 54, 56, 58, 60. A user 62 is depicted below the controller 40 on the page. The central element 52 may be arranged to provide information to the user 62, while the corner elements 54-60 may provide selectable icons with which the user can interact with the user interface 50. In FIG. 2A, for example, the central element 52 includes an upper portion 52a displaying a title, a central portion 52b displaying a quantity of label stock remaining on the supply spool support 10, and a bottom portion 52c displaying a throughput in labels per minute (l/m). It will be appreciated that the central element 52 may display any other information as appropriate. Indeed, the information displayed by the central element 52 will vary in dependence upon the particular screen of the user interface 50 selected by the user 62, and in dependence upon the particular type of apparatus with which the controller 40 is used. For example, an industrial printer may display different information to an industrial labelling machine. The central element 52 may further provide an interface for input to the user interface 50. For example, the central element 52 may display text entry fields, numerical entry fields, dials, etc.

In FIG. 2A, the corner elements 54 is a "home" icon, the corner element 56 is a "ribbon feed" icon, the corner element 58 is a "settings" icon and the corner element 60 is a "start/stop" icon. It will be appreciated that the corner elements may provide any icon as required by the particular user interface 50 and a particular context, and may be configurable by a user. For example, where the central element 52 displays an option, two of the corner elements may provide "yes" and "no" icons. Additionally one or more of the corner elements may provide, for example, navigation (such as "back" and "forward") options. Additionally, the corner elements 54-60 need not provide selectable icons and may provide additional information or be redundant in some circumstances. Where appropriate, areas of the display 42 that are not occupied by the elements 52-60 may provide additional information, such as navigation indications (e.g. breadcrumbs, current screen indicators, etc.) and device status indicators.

In FIG. 2A, the first corner element 54 is positioned at a first corner portion 50a of the display 42. The first corner portion 50a is a particular physical part of the display 42. That is, the first corner portion 50a remains the first corner portion 50a upon rotation of the display 42. For example, the first corner portion 50a may be defined by a first group of pixels of the display 42. The second corner element 56 is positioned at a second corner portion 50b of the display 42. Again, the second corner portion 50b may be defined by a second group of pixels of the display 42. The third corner element 58 is positioned at a third corner portion 50c of the display 42. The third corner portion 50c may be defined by a third group of pixels of the display 42. The fourth corner element 60 is positioned at a fourth corner portion 50d. The fourth corner portion 50d may be defined by a fourth group of pixels of the display 42. While the corner portions 50a-50d are depicted as circles in the figures, it is to be understood that this is merely exemplary.

For the purposes of the present example, the arrangement of the user interface as shown in FIG. 2A may be considered to be a "default", or "starting" position. It will be readily understood from the teaching herein, however, that other arrangements may be selected as a "default" position. For example, an alternative default orientation may be arranged such that the edge of the display 42 between the corner portions 50a, 50b and the edge of the display 42 between the corner portions 50c, 50d are parallel with the line 64, while the edges between corner elements 50a, 50d and between 50b, 50c are parallel with the line 66. However, any appropriate "default" orientation may be used.

FIG. 2B schematically illustrates components of the labelling machine 1 in accordance with an exemplary embodiment. It can be seen that the labeling machine 1 comprises a CPU 1a which is configured to read and execute instructions stored in a volatile memory 1b which takes the form of a random access memory. The volatile memory 1b stores instructions for execution by the CPU 1a and data used by those instructions. For example, instructions may be provided to control a labeling operation of the labeling machine 1. Further instructions may be provided to cause the processor to display and update the user interface 50 on the display 42.

The labeling machine 1 further comprises non-volatile storage 1c, shown in the form of a hard disc drive, though it will be appreciated that any other form of non-volatile storage may be used. Computer readable instructions for causing the labeling machine 1 to control labeling operations of the labeling machine and to cause the processor to display and update the user interface on the display 42 may be stored in the non-volatile storage 1c. The labeling machine 1 further comprises an I/O interface 1d to which peripheral devices used in connection with the labeling machine 1 are connected. More particularly, the display 42 and the dial 44 are connected to the I/O interface 1d. Other input devices may also be connected to the I/O interface 1d, such as a keyboard 1f, to allow further user interaction with the labelling machine 1. A network interface 1h may be provided to allow the labelling machine 1 to be connected to appropriate computer networks, so as to receive and transmit data from and to other devices. The CPU 1a, volatile memory 1b, non-volatile storage 1c, I/O interface 1d, and network interface 1h, are connected together by a bus 1i.

It will be appreciated that the arrangement of components illustrated in FIG. 2B is merely exemplary, and that the labelling machine 1 may comprise different, additional or fewer components than those illustrated in FIG. 2B.

Referring again to FIG. 2A, the first to fourth corner elements 54-60 may be considered to be generally positioned in a top-left (TL), bottom-left (BL), bottom-right (BR) and top-right (TR) orientation, respectively, from a frame of reference defined by the user 62. This frame of reference is depicted in FIG. 2A by a dashed line 64 extending vertically from the user 62 and a dashed line 66 perpendicular to and intersecting the dashed line 64 at a centre point of the central element 52. Generally, the bottom (or lower) half of the display 42 may be considered to be that below the dashed line 66 (i.e. depicted closest to the user 62), while the top (or upper) half of the display 42 may be considered to be that above the dashed line 66. The right half of the display 42 may be considered to be that right of the dashed line 64, while the left half of the display 42 may be considered to be that to the left of the dashed line 64, from the point of view of the user 62.

It will be appreciated that in the arrangement of FIG. 2A, the corner elements 54 and 58 do not fall entirely within a left or right half of the display 42. However, for the purpose of the present example embodiment, a position with respect to top/bottom is determined first, with the most right of the top residing elements being labelled the top-right corner element, the most left of the bottom residing elements being labelled the bottom-left corner element, and so on. As such, it can be seen from FIG. 2A, that the corner element 54 is the top-right corner element, while the corner element 58 is the bottom-left corner element, from the perspective of the user 62.

It can be seen that the centre element 52 and the first to fourth corner elements 54-60 are shown in an "upright" orientation with respect to the position of the user 62. In this way, the user can most easily see and understand the information provided in the centre and first to fourth corner elements 52-60. In the arrangement of FIGS. 1 and 2A, the user is depicted adjacent the corner element 50c. As described above, however, the orientation of the labelling machine 1 is configurable to fit within a user's existing production line. As such, the relative position and orientation of the display 42 may vary with respect to the user 62.

Figure 3:
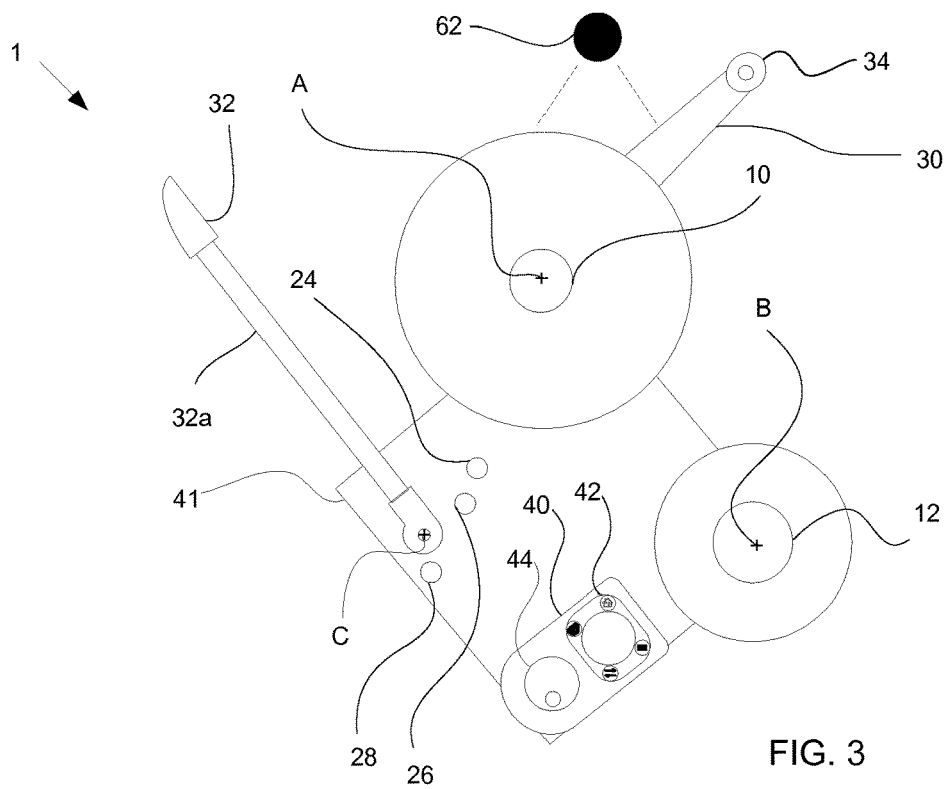
FIG. 3 is a schematic top view of a portion of the labelling machine in a different orientation to that of FIG. 1.
Figure 4A:
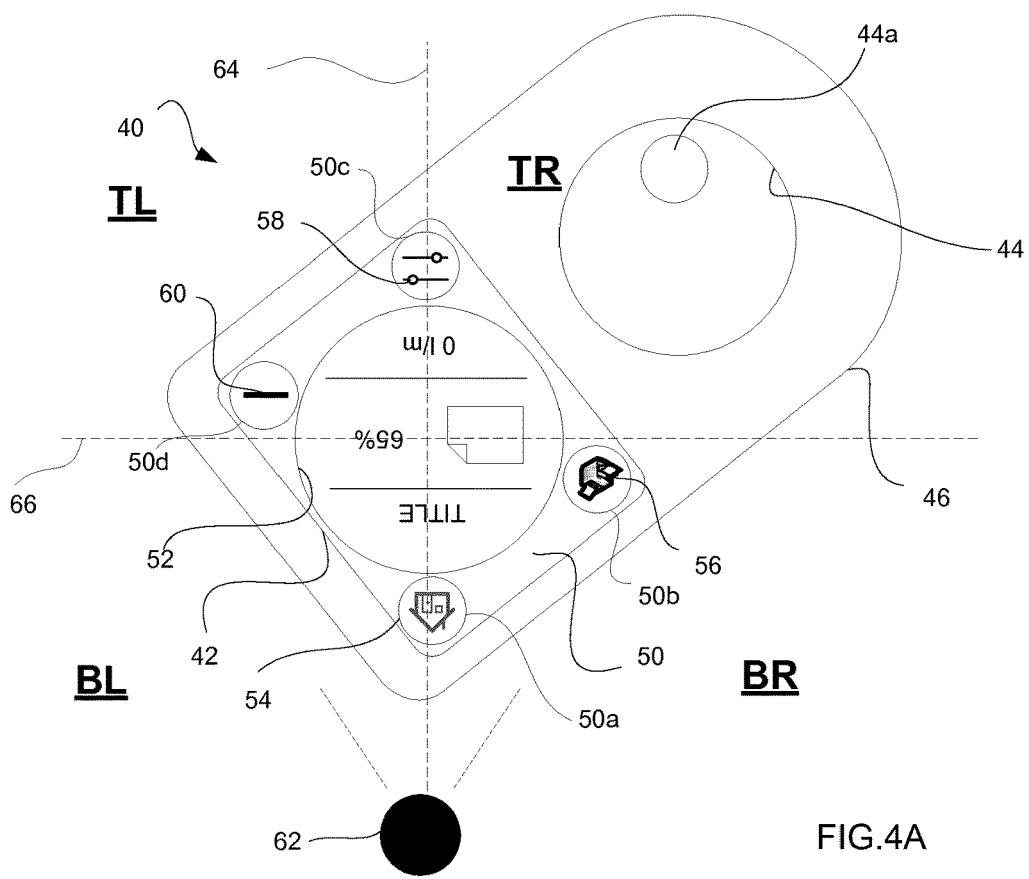
FIG. 4A is a schematic illustration of the controller of the labelling machine of FIG. 3 before a re-orientation operation.

FIG. 3 is a schematic illustration of the labelling machine 1 showing the customer 62 in a different position and orientation with respect to the labelling machine 1. In particular, the labelling machine 1 has been rotated by approximately one-hundred and eighty (180) degrees such the user 62 is adjacent the supply support spool 10 and the corner portion 50a of the display 42 is the closest corner portion to the user 62. FIG. 4A schematically depicts the orientation of the controller 40 and the display 42 from the perspective of the user 62, with the orientation of the user interface 50 as depicted in FIG. 2A. It can be seen from FIG. 4A that in this case the central element 52 and each of the corner elements 54-60 are rotated 180 degrees (i.e. "upside down") with respect to the user 62 making it difficult for the user 62 to utilise the user interface 50.

In the depicted example embodiment, the user 62 may utilise the dial 44 to provide rotation instructions to the user interface 50, to cause the processor 1a to perform a re-orientation operation for the user interface 50. In the example depicted in FIG. 4B, the dial 44 has been rotated by one-hundred and eighty (180) degrees. The rotation of the dial 44 provides a rotation instruction to the user interface 50 which causes the central element 52 and each of the corner elements 54-60 to rotate about their respective centre points. In the depicted example, rotation of the dial 44 through one-hundred and eighty (180) degrees causes an instruction to be provided to rotate each of elements 52-60 by one-hundred and eighty (180) degrees about their centre-point. As such, each of the elements 52-60 of the user interface 50 is now "upright" from the perspective of the user 62. It will be appreciated, however, that a sensitivity of the dial 44 (or other rotation input means) will determine an extent to which the dial need be rotated in order to provide a rotation instruction that indicates a particular rotation amount. That is, in some embodiments, it may be necessary to rotate the dial 44 by more (or less) than one-hundred and eighty (180) degrees in order to provide a rotation instruction that indicates a rotation amount of one-hundred and eighty degrees.

Additionally, it can be seen that the rotation instruction has caused each of the corner elements 54-60 to cycle two corner portions 50a-50d. In particular, the corner element 54 has cycled from the corner portion 50a to the corner portion 50c, the corner element 56 has cycled from the corner portion 50b to the corner portion 50d, the corner element 58 has cycled from the corner portion 50c to the corner portion 50a and the corner element 60 has cycled from the corner portion 50d to the corner portion 50b. It will be appreciated that while it is described above that the corner elements 54-60 "cycled through corner portions", this is merely exemplary to aid understanding and does not imply a visualisation on the display 42. It will be appreciated that the re-arrangement of the corner elements 54-60 between different corner portions 50a-50d may be accomplished by any appropriate mechanism and that intermediate movement of corner elements between corner portions need not be visualised.

Figure 4B:
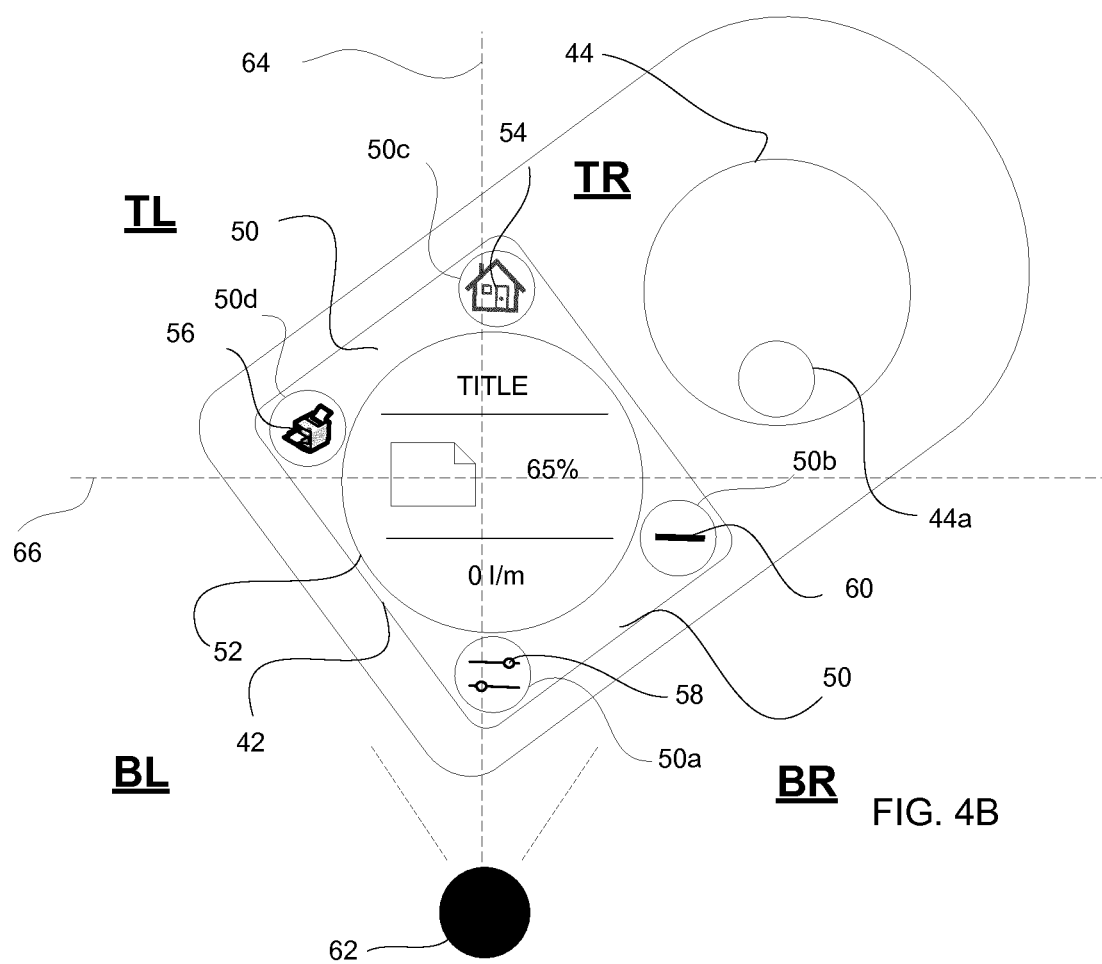
FIG. 4B is a schematic illustration of the controller of the labelling machine of FIG. 3 after a re-orientation operation.

Due to the centre-point rotation of the elements 52-60 and the cycling between corner portions of the corner elements 54-60, the user interface 50 in FIG. 4B is in generally the same orientation with respect to the user 62 as the user interface in FIG. 2A, despite the rotation of the labelling machine 1. That is, from the perspective of the user 62, the corner element 54 remains in a top-right portion of the display 42, the corner element 56 remains in a top-left portion of the display 42, the corner element 58 remains in a bottom-left portion of the display 42 and the corner element 60 remains in a bottom-right corner of the display 42.

Figure 5:
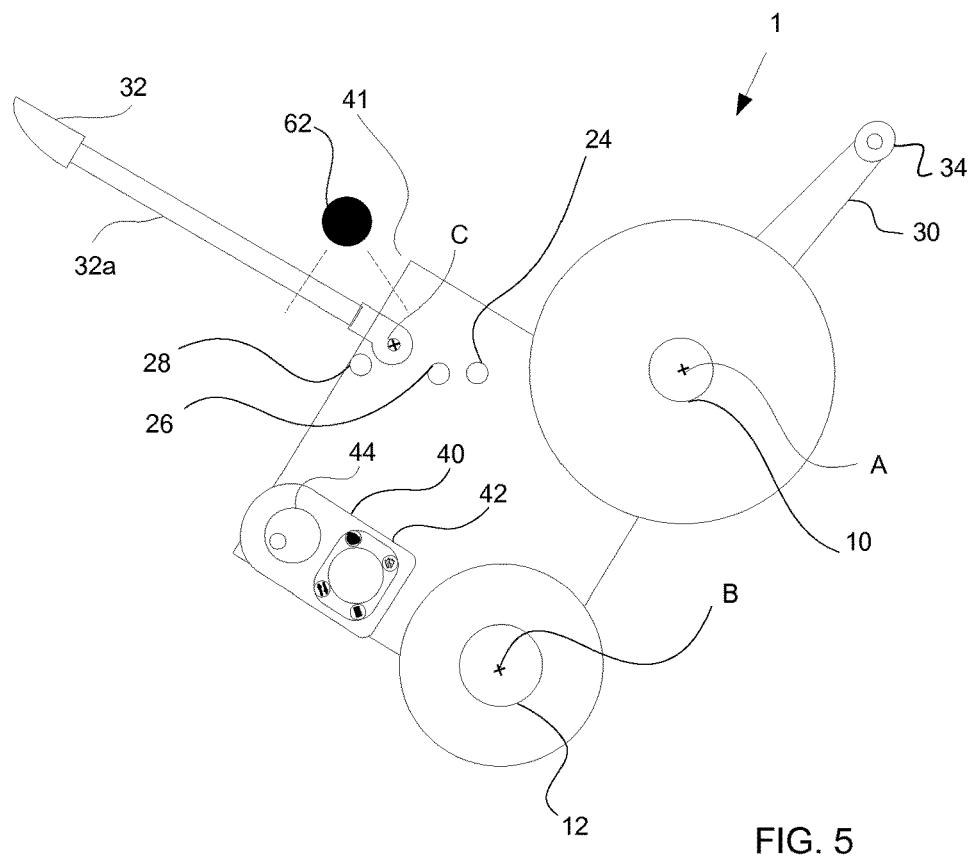
FIG. 5 is a schematic top view of a portion of the labelling machine in a different orientation to that of FIGS. 1 and 3.
Figure 6A:
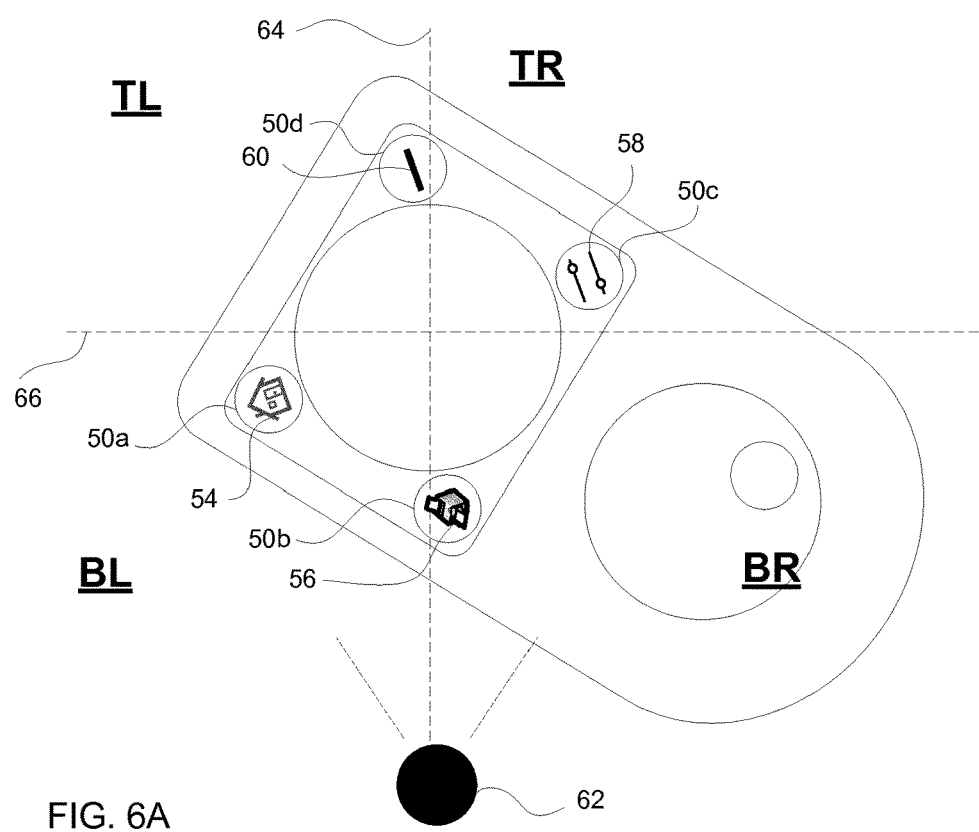
FIG. 6A is a schematic illustration of the controller of the labelling machine of FIG. 5 before a re-orientation operation.

FIG. 5 schematically illustrates an example of the labelling machine 1 in yet a different orientation with respect to the user 62. In the example of FIG. 5, the labelling machine 1 has been rotated through an angle of approximately one-hundred (100) degrees to the left with respect to the line of sight of the user 62. FIG. 6A schematically depicts the orientation of the controller 40 and the display 42 from the perspective of the user 62, with the user interface 50 in the default orientation. It can be seen from FIG. 6A that in this case the central element 52 and each of the corner elements 54-60 are rotated by approximately 100 degrees with respect to the user 62, again making it difficult for the user 62 to utilise the user interface 50.

Figure 6B:
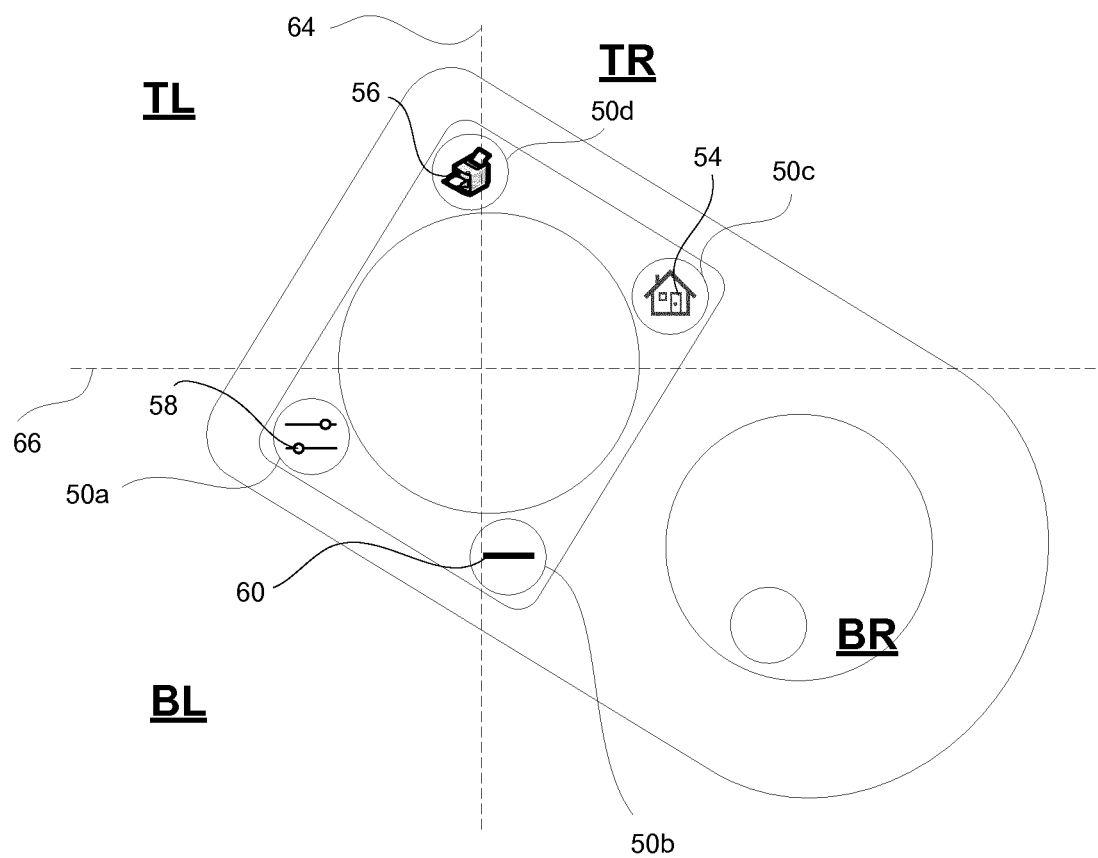
FIG. 6B is a schematic illustration of the controller of the labelling machine of FIG. 5 after a re-orientation operation.

The user 62 may therefore utilise the dial 44 to provide rotation instructions to the user interface 50, to cause the processor 1a to manipulate the orientation of the user interface 50. In the example depicted in FIG. 6B, the dial 44 has been rotated by approximately 100 degrees. As described above, the rotation of the dial 44 provides a rotation instruction to the user interface 50 which causes the central element 52 and each of the corner elements 54-60 to rotate by approximately one-hundred (100) degrees about their respective centre points. As such, each of the elements 52-60 of the user interface 50 is once again "upright" from the perspective of the user 62.

Additionally, the rotation instruction has caused each of the corner elements 54-60 to cycle two corner portions 50a-50d compared with their positions is FIG. 2A. In particular, the corner element 54 has cycled from the corner portion 50a to the corner portion 50c, the corner element 56 has cycled from the corner portion 50b to the corner portion 50d, the corner element 58 has cycled from the corner portion 50c to the corner portion 50a and the corner element 60 has cycled from the corner portion 50d to the corner portion 50b.

Due to the centre-point rotation of the elements 52-60 and the positional rotation of the corner elements 54-60, the user interface 50 in FIG. 4B is in the same orientation with respect to the user 62 as the user interface in FIG. 2A, despite the rotation of the labelling machine 1. That is, from the perspective of the user 62, the corner element 54 remains in a top-right portion of the display 42, the corner element 56 remains in a top-left portion of the display 42, the corner element 58 remains in a bottom-left portion of the display 42 and the corner element 60 remains in a bottom-right corner of the display 42.

From the above, it will be understood that the user 62 may provide a single rotation input to manipulate the orientation of various elements of the user interface 50 such that each element is presented in an "upright" orientation, and such that the relative positions of the corner elements are generally the same with respect to the user 62. That is, the single rotation instruction can be used to ensure each corner element is positioned in the same one of the top-left, top-right, bottom-left and bottom-right positions (from the user's perspective) despite rotation of the labelling machine 1 with respect to the position of the user through any one of 360 degrees of rotation.

FIGS. 7 and 8A-F schematically illustrate in more detail how rotation instructions may cause re-orientation of the corner elements 54-60 between different ones of the corner portions 50a-50d. To aid clarity, contents of the central element 52 are not depicted in FIGS. 7 and 8.

Figure 7:
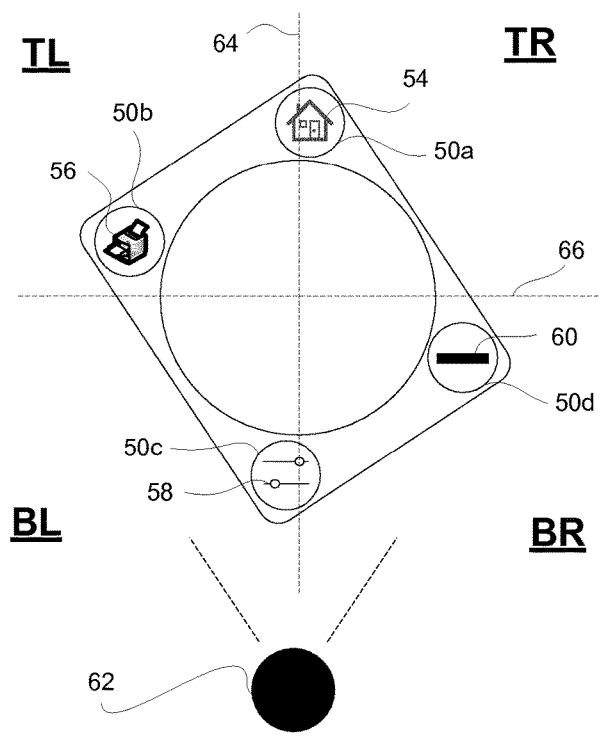
FIG. 7 is a schematic illustration of the display of a controller in a first orientation.

FIG. 7 shows the default position of the display 42 and the user interface 50. In the default position, the corner element 54 is positioned in the corner portion 50a which (assuming a user position adjacent the corner portion 50c as depicted) occupies the top-right portion of the display 42 from the perspective of the user 62. The corner element 56 is positioned in the corner portion 50b which occupies the top-left portion of the display 42 from the perspective of the user 62. The corner element 58 is positioned in the corner portion 50c which occupies the bottom-left portion of the display 42 from the perspective of the user 62. The corner element 60 is positioned in the corner portion 50d which occupies the bottom-right portion of the display 42 from the perspective of the user 62.

Figures 8A, 8B:
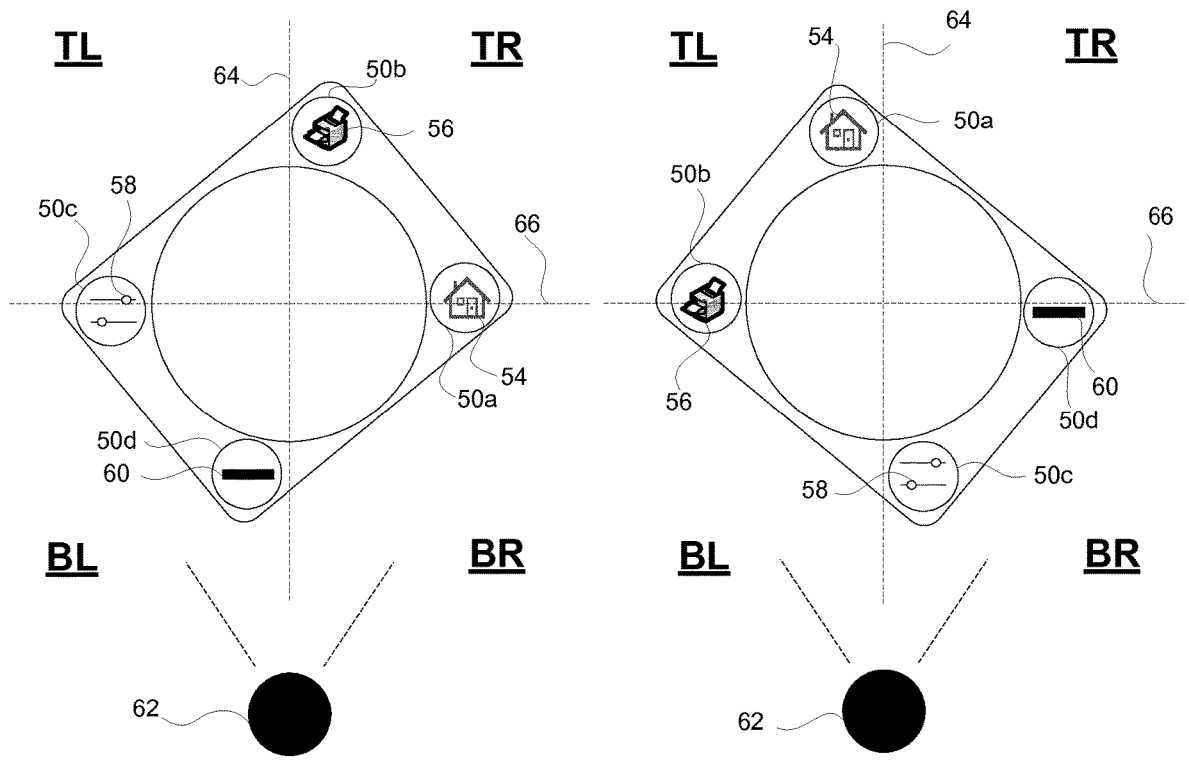
FIGS. 8A-8H are schematic illustrations of the display in different orientations.

FIGS. 8A, 8B illustrate rotations of the display 42 from the default orientation for which corresponding rotation instructions that cause the elements 52-60 to appear "upright" do not cause a cycling of the corner elements 54-60 through different ones of the corner portions 50a-50d.

In FIG. 8A, for example, the labelling machine 1 (and therefore the display 42) is rotated by approximately eighty-five (85) degrees to the right of the default orientation. A corresponding rotation instruction has been received to rotate the central element 52 and each of the corner elements 54-60 eighty-five (85) degrees to the left about their centre points, such that the elements 52-60 each appear "upright" from the perspective of the user 62. Despite the approximately eighty-five (85) degree rotation of the display 42, the corner portions 50a and 50b remain the two "top most" corner elements (with the corner portion 50a having a larger portion above the line 66 than the corner portion 50c), with the corner element 54 being taken to be the "right most" of the top residing elements and the corner element 56 remaining the "left most" of the top residing elements. The corner elements 58 and 60 are taken to be the "bottom most" corner elements, with the corner element 58 being the "left most" of the bottom residing elements and the corner element 60 being the "right most" of the bottom residing elements. As such, the corner elements 54-60 remain in the same corner portions 50a-50d of the display 42 as in default orientation.

Similarly, in FIG. 8B, despite a small rotation (of approximately fifteen (15) degrees to the left) of the display 42, the corner elements 54-60 are still judged to reside in the same top/bottom, left/right orientations with respect to the user 62 and as such are positioned within the same corner portions 50a-50c of the display 42 as in the default orientation.

Figure 8C:
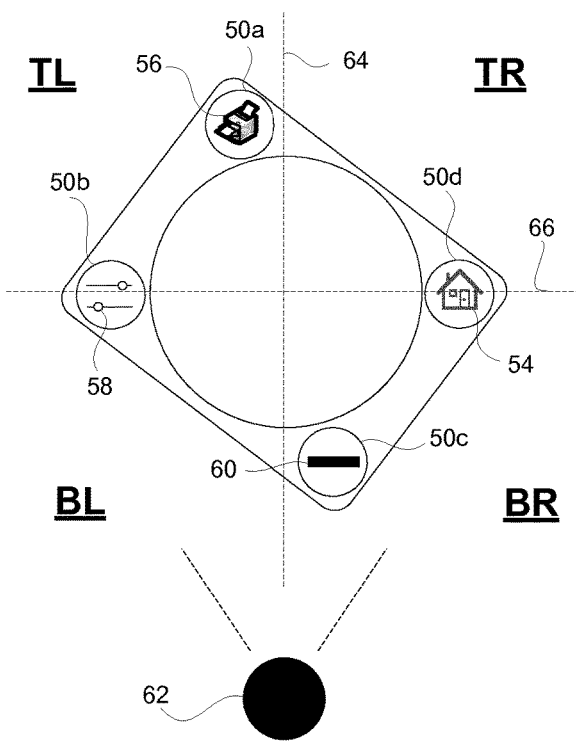
Figure 8D:
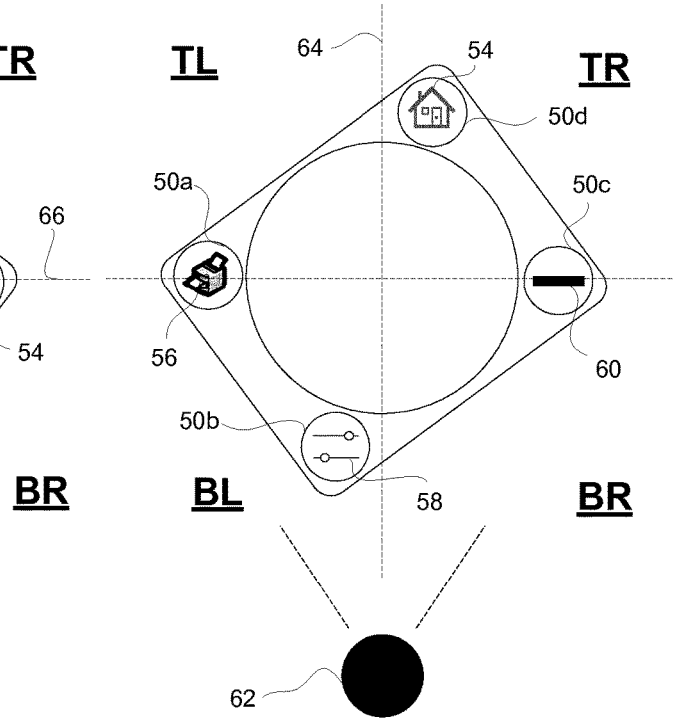

FIGS. 8C, 8D schematically illustrate orientations of the display 42 in which the corner elements 54-60 have cycled one position to the right from the default positions. FIG. 8C schematically illustrates a minimum rotation (approximately sixteen (16) degrees to the left) of the display 42 from the default orientation which results in the corner elements 54 being positioned one position to the right of the default orientation when a rotation instruction is provided to cause the elements 52-60 to appear "upright" from the perspective of the user 62.

As a result of the rotation shown in FIG. 8C, the corner portion 50d becomes an upper corner portion, while the corner portion 50b becomes a lower corner portion. The corner portion 50a is now the upper left-most corner portion, the corner portion 50d is the upper right-most corner portion, the corner portion 50b is the bottom left-most corner portion and the corner portion 50c is the bottom right-most corner portion. As such, to retain the general relative positions of the corner elements 54-60, the corner element 54 has moved to the corner portion 50d, the corner element 56 has moved to the corner portion 50a, the corner element 58 has moved to the corner portion 50b and the corner element 60 has moved to the corner portion 50c.

FIG. 8D schematically illustrates a maximum rotation (approximately ninety-five (95) degrees to the left) from the default orientation which results in the corner elements 54 being positioned one corner portion to the right of the default orientation when a rotation instruction is provided to cause the elements 52-60 to appear "upright" from the perspective of the user 62.

Figure 8E:
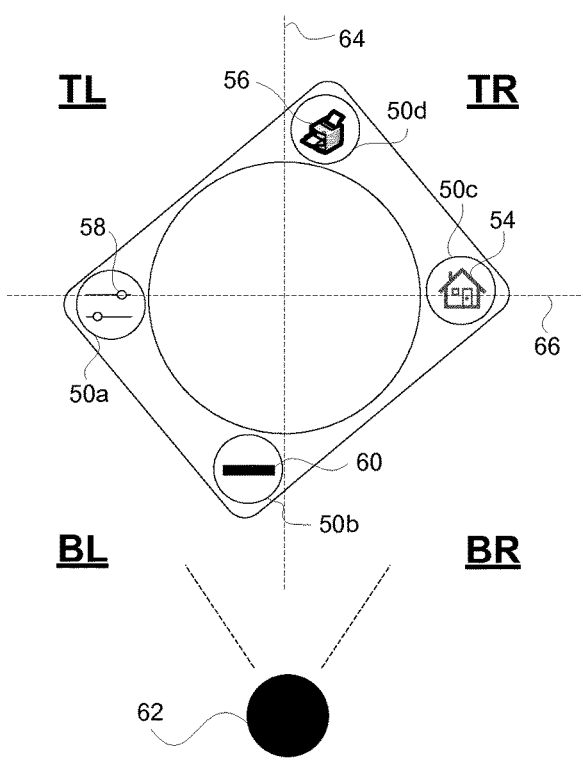
Figure 8F:
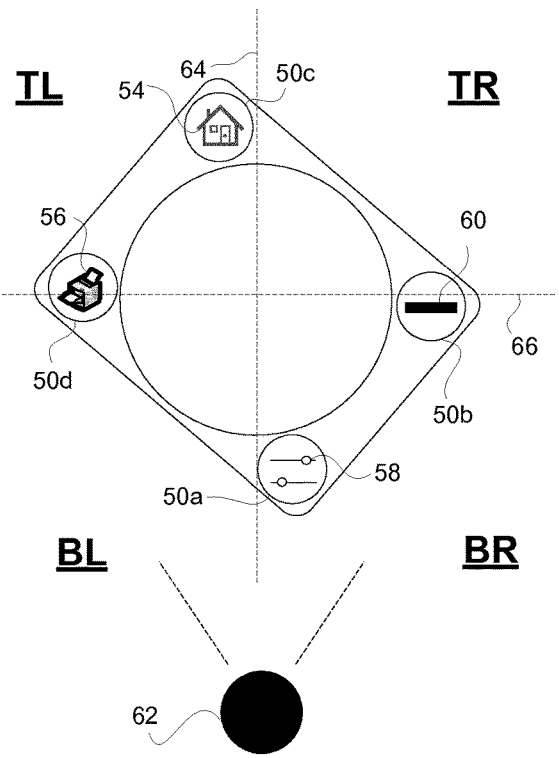

FIGS. 8E, 8F schematically illustrate orientations of the display 42 in which the corner elements 54-60 have cycled two positions to the right from the default positions. FIG. 8E schematically illustrates a minimum rotation (approximately ninety-six (96) degrees to the left) from the default orientation which results in the corner elements 54 cycling two positions to the right of the default orientation when a rotation instruction is provided to cause the elements 52-60 to appear "upright" from the perspective of the user 62. As a result of the rotation shown in FIG. 8E of the display 42, the corner portion 50c becomes an upper portion, while the corner portion 50a becomes a lower corner portion. The corner portion 50a is now the lower left-most corner portion, the corner portion 50d is the upper left-most corner portion, the corner portion 50c is the upper right-most corner portion and the corner portion 50b is the bottom left-most corner portion. As such, to retain the general relative positions of the corner elements 54-60, the corner element 54 has moved to the corner portion 50c, the corner element 56 has moved to the corner portion 50d, the corner element 58 has moved to the corner portion 50a and the corner element 60 has moved to the corner portion 50b.

FIG. 8F schematically illustrates a maximum rotation (approximately one-hundred and seventy-five (175) degrees to the left) of the display 42 from the default orientation which results in the corner elements 54 cycling two corner portions to the right of the default orientation when a rotation instruction is provided to cause the elements 52-60 to appear "upright" from the perspective of the user 62.

Figures 8G, 8H:
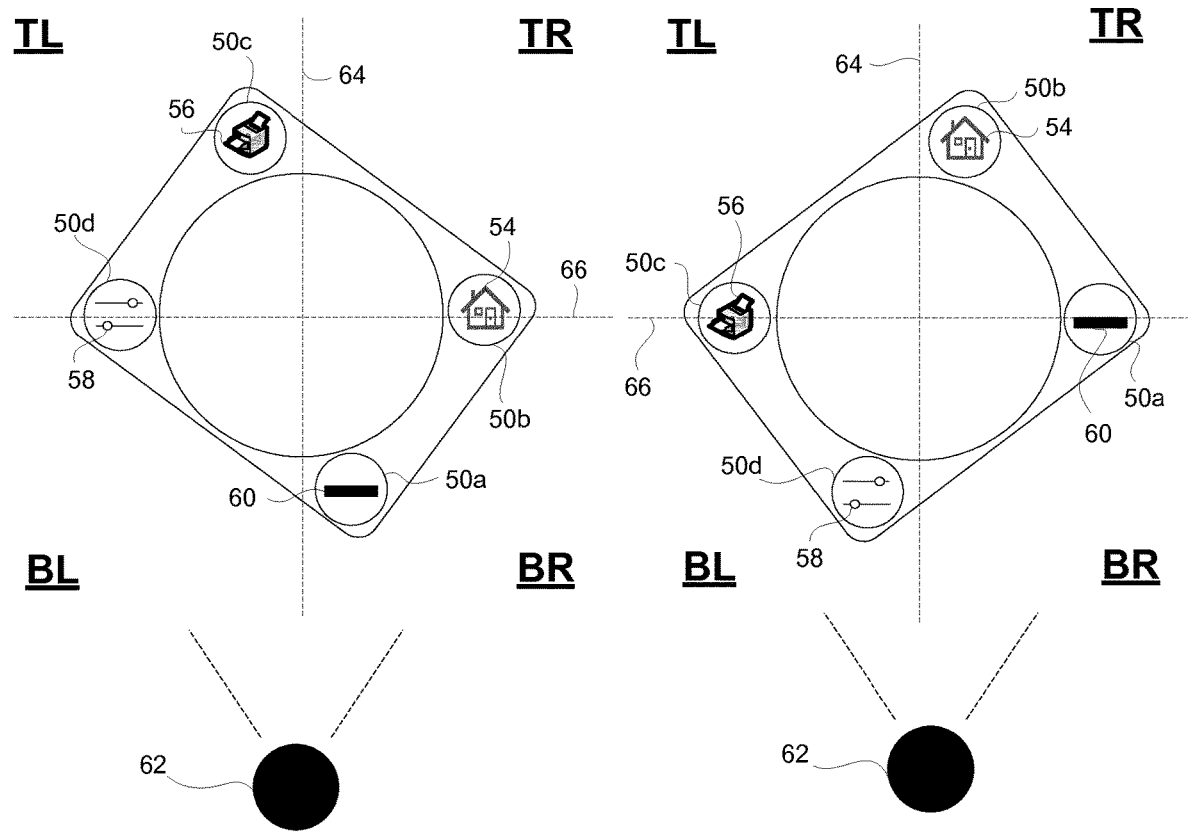

FIGS. 8G, 8H schematically illustrate orientations of the display 42 in which the corner elements 54-60 have cycled three positions to the right from the default positions. FIG. 8G schematically illustrates a minimum rotation (approximately one-hundred and seventy-six (176) degrees to the left) from the default orientation which results in the corner elements 54 cycling three positions to the right of the default orientation when a rotation instruction is provided to cause the elements 52-60 to appear "upright" from the perspective of the user 62.

As a result of the rotation of the display 42 shown in FIG. 8G, the corner portion 50*b* becomes an upper portion, while the corner portion 50*d* becomes a lower corner portion. The corner portion 50*a* is now the lower right-most corner portion, the corner portion 50*d* is the lower left-most corner portion, the corner portion 50*c* is the upper left-most corner portion and the corner portion 50*b* is the upper right-most corner portion. As such, to retain the general relative positions of the corner elements 54-60, the corner element 54 has moved to the corner portion 50*b*, the corner element 56 has moved to the corner portion 50*c*, the corner element 58 has moved to the corner portion 50*d* and the corner element 60 has moved to the corner portion 50*a*.

FIG. 8H schematically illustrates a maximum rotation (approximately two-hundred and seventy-five (275) degrees to the left) of the display 42 from the default orientation which results in the corner elements 54 cycling three corner portions to the right of the default orientation when a rotation instruction is provided to cause the elements 52-60 to appear "upright" from the perspective of the user 62.

It should be noted that FIGS. 8A-8E are provided to aid visualisation only and do not provide representation of particular angles of rotation. Further, while examples are provided of rotation limits which may result in cycling of the corner elements through different numbers of corner portions, these are only exemplary and other limits may be used in other embodiments. For example, in the above exemplary embodiment limits of rotation are selected based upon an initial "top and bottom" determination—i.e. it is first determined which corner elements are the "top" and "bottom" elements before determining which of the "top" elements is most-left and most-right and which of the "bottom" elements is most-left and most-right. In an alternative embodiment, the rotation limits may be based upon an initial "left and right" determination. That is, the rotation limits may be selected based upon rotations that cause corner elements' left/right orientations to change, before considering which of the left and right corner elements are most-top or most-bottom. With reference to FIG. 2A, for example, it will be appreciated that this would cause a cycling to occur after a smaller degree of rotation to the left of the default orientation.

The particular angles of rotation that result in a cycling of the corner elements 54-60 may be pre-determined in accordance with any desired outcome. For example, in an alternative embodiment, the corner elements may be cycled each time a rotation instruction is received that indicates a ninety (90) degree rotation in either direction. Further, the granularity of the limits (e.g. whole degrees, half degrees, etc.) may be dependent upon the accuracy provided by the rotation input device.

Figure 9:
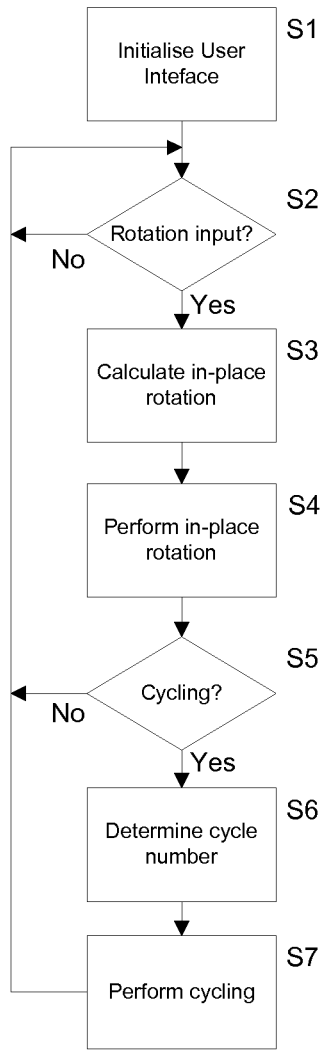
FIGS. 9 and 10 are flowcharts depicting processing that may be performed by a controller in accordance with some embodiments.

FIG. 9 is a flowchart showing an exemplary algorithm that may be performed by the processor 1*a* (or equivalent processing device in an alternative embodiment) to process rotation instructions to update the user interface 50.

At a step S1 the user interface 50 is initialised. For example, with reference to the exemplary embodiment illustrated in FIG. 2B, the processor 1*a* may execute instructions loaded into the memory 1*b* to cause the user interface 50 to be displayed on the display 42. The user interface 50 may be initialised with a default orientation (e.g. the orientation shown in FIG. 2A). Having initialised the user interface 50, processing passes to step S2 at which it is determined whether a rotation instruction has been received. If a rotation instruction has not been received, processing remains at step S2.

As described above, in some embodiments a rotation instruction may be received from the dial 44. For example, the user 62 may determine that the orientation of the user interface 50 is such that the elements 52-60 are not "upright" from the user's perspective. The user 62 may therefore rotate the dial 44, which may be arranged to transmit a signal over the I/O interface 1*d*, which signal is interpreted by the processor 1*a* as an indication of a rotation angle and direction. For example, the user 62 may rotate the dial 44 by ninety (90) degrees to the left causing a corresponding signal to be generated by the dial 44 which signal is interpreted by the processor as a rotation instruction to rotate the elements 52-60 by ninety (90) degrees to the left.

In other embodiments, a rotation instruction may be received from other rotation input devices. For example, a rotation input device may be provided on the display 42 as part of the user interface 50, e.g. in the form of a numerical input pad by which the user 62 can specify a particular angle of rotation, in the form of a dial, or in any other form that allows a user to specify a rotation angle. Such a numerical input pad may allow a user to specify a particular direction, or a fixed direction may be used. In another exemplary alternative embodiment, a rotation input device may be provided as part of the labelling machine 1. For example, a gyroscope and/or an electronic compass (e.g. a magnetometer) may be provided within the housing 46 of the controller 40 to detect an orientation of the labelling machine 1. Such a detected orientation of the labelling machine 1 may be used to determine a rotation from a predetermined default orientation and may therefore provide a suitable rotation instruction. In a yet further exemplary alternative embodiment, a rotation input device may comprise a user detection device (e.g. a camera and/or a receiver for receiving a location signal from a device carried by the user 62). In this way, the position of the user 62 may provide a suitable rotation input from which a rotation of the labelling machine 1 with respect to the user 1 may be determined. More generally, it will be appreciated from the above that a suitable rotation input device may take any suitable from that allows a determination of a rotation of the labelling machine 1 from a predetermined default orientation.

The rotation input includes a rotation direction. The way in which the rotation direction is determined will be dependent upon the particular rotation input device and may be configured in any way. For example, in the embodiment of FIG. 1, the rotation direction may configured to be the direction of rotation of the dial 44. Alternatively, the rotation direction may be configured to be the opposite direction to the rotation of the dial 44. Where the rotation input device automatically determines an angle of rotation between the user and the labelling machine 1, the rotation direction of the rotation input may be the opposite direction to the determined angle of rotation.

Referring again to FIG. 9, if it is determined at step S2 that a rotation instruction has been received, processing passes to step S3 at which an in-place rotation is calculated for the elements 52-60. For example, if a rotation instruction indicates a ninety (90) degree rotation to the left, an in-place rotation of ninety (90) degrees to the left may be determined at step S3. Processing passes from step S3 to step S4 at which the in-place rotation is performed—i.e. the elements 52-60 are displayed rotated about their centre-points on-screen to reflect the rotation instruction.

From step S4 processing passes to step S5 at which it is determined whether a cycling of corner elements 54-60 through corner portions 50a-50d is required. As described above with reference to FIGS. 8A-8D, the determination as to whether a cycling of corner elements through the corner portions is required will depend upon the particular requirements of the user interface 50. In some embodiments, however, it may be determined that a cycling of corner elements is required if the rotation instruction indicates a rotation greater than a predetermined limit. For example, it may be determined that a cycling of corner elements is required if the rotation instruction indicates a rotation angle which is greater than fifteen (15) degrees to the left.

If it is determined at step S5 that cycling is not required, processing returns to step S2. If, on the other hand, it is determined at step S5 that cycling is required, processing passes to step S6 at which a required number of corner portions to cycle the corner elements 54-60 is determined. Again, the number of corner portions required may be determined based upon the particular requirements of the apparatus or user interface. For example, it may be determined that a cycle by a single corner portion to the left (e.g. each corner element moves one corner portion to the left) is required when the rotation instruction is for a rotation angle between sixteen (16) and ninety-five (95) degrees to the left, that a cycle of two corner portions to the left is required when the rotation instruction is for a rotation angle between ninety-six (96) and one-hundred and seventy-five (175) degrees to the left and that a cycle of three corner portions to the left is required when the rotation instruction is for a rotation angle between one-hundred and seventy-six (176) and two-hundred and seventy-five (275) degrees to the left.

From step S6, processing passes to step S7 at which the corner elements 54-60 are cycled through the determined number of corner portions in the determined direction. Processing may pass from step S7 to step S2 to await further rotation instructions. In some embodiments, the processing of FIG. 9 may be performed for each unit of rotation input received. For example, in some embodiments, the user interface 50 may be updated on-screen in a continuous manner as user input is received. With reference to the labelling machine 1 of FIG. 1, the user input 50 may be updated in response to each discernible amount of rotation (e.g. whole degrees, half degrees, etc.) of the dial 44 to provide visual feedback to the user 62.

Figure 10:
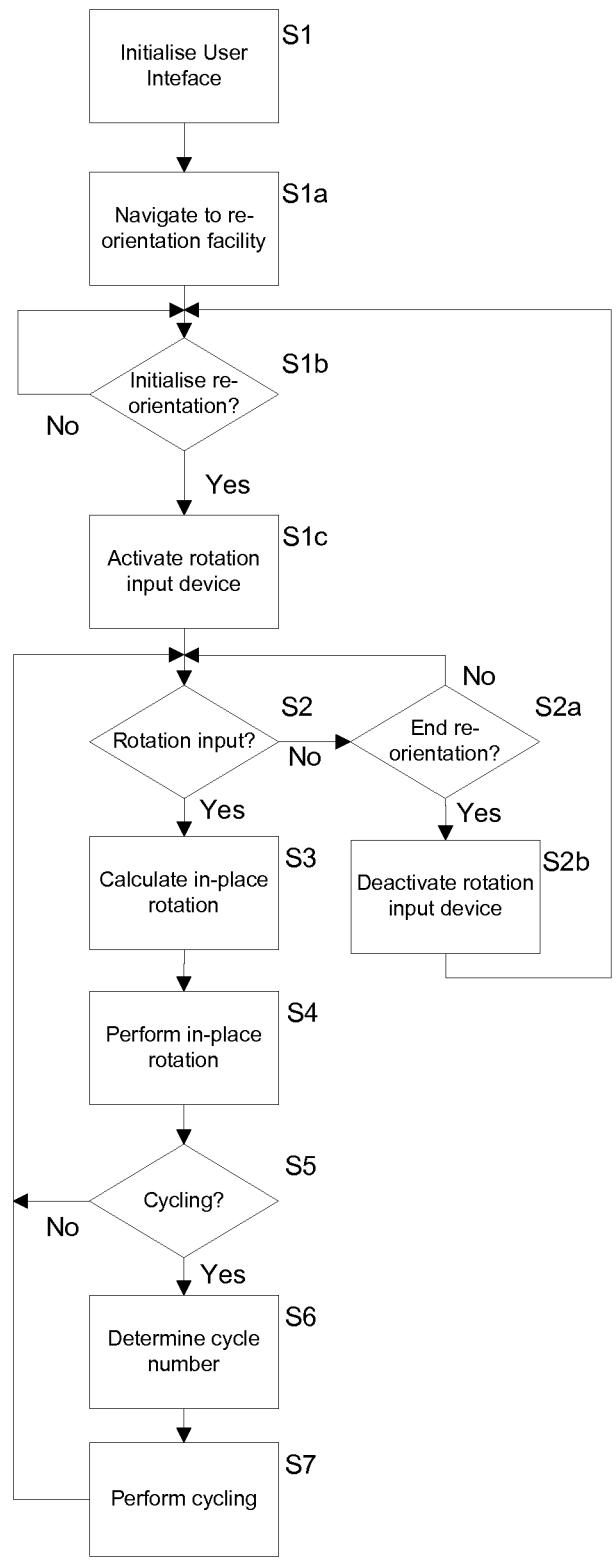

In some embodiments, in addition to providing a rotation input for orientating the user interface 50, the dial 44 may be utilised to further interact with the user interface 50, for example by selecting ones of the corner elements 54-60. In such embodiments, a user may select an orientation option from the user interface 50 before using the dial 44 (or other rotation input device) to adjust an orientation of the user interface 50. An example of processing in which a user first navigates to a particular section of the user interface 50 to perform a re-orientation operation is shown in FIG. 10. The processing of FIG. 10 is similar to that of FIG. 9 and like reference numerals have been used for like processing steps. In the example embodiment of FIG. 10, however, from step S1 processing passes to step S1a at which the user 62 navigates to a specific re-orientation facility of the user interface 50. For example, from the screen depicted in FIG. 2A, the user 62 may utilise the dial 44 to navigate to the corner element 58. Navigation may be visually represented on the display 42 in any appropriate way. For example, continued rotation of the dial 44 may cause successive ones of the corner elements 54-60 to be highlighted on the display 42 (e.g. by a ring enclosing a highlighted corner element, or by any other mechanism). Selection of the corner element 58 (or one or more additional corner elements displayed subsequent to selection of the corner element 58), for example by depressing the dial 44, may navigate to a re-orientation facility of the user interface 50.

Having navigated to the re-orientation facility, processing passes to step S1b, where it is determined whether the re-orientation process has been initialised. For example, a prompt may be displayed on the display 42 (e.g. within the central element 52) for the user to depress the dial 44 to begin the re-orientation process. It will be understood, however, that any other initialisation mechanism may be employed. If it is detected that the re-orientation process has not been initialised, processing may remain at step S1b. While the processing of FIG. 10 remains at step S1b, the user 62 may navigate away from the re-orientation facility (e.g. by using the dial 44 to select a different one of option, or a "back" button provided by the corner elements displayed to the user).

If, on the other hand, it is detected at step S1b that the user 62 has initialised the re-orientation process, processing passes to step S1c at which the rotation input device is activated. For example, in the embodiment of FIG. 1 in which a dial 44 is provided, activation of the rotation input device may include causing the user interface 50 to interpret rotation of the dial 44 as providing a rotation instruction for re-orientating the user interface (rather than providing a navigation instruction for selecting ones of the corner elements of the user interface 50). In other embodiments, activation of the rotation input device may comprise achieving a listener for signals received from other rotation input devices (such as a gyroscope or electronic compass) as described above.

Processing passes from step S1c to step S2. In FIG. 10, if it is determined at step S2 that a rotation input has not been received, processing passes to step S2a at which it is determined whether an instruction to end the re-orientation process has been received. In one embodiment, for example, the user 62 may exit the re-orientation process, for example by depressing the dial 44 (or by any other appropriate mechanism). If it is determined at step S2a that an instruction has been received to end the re-orientation process, processing passes to step S2b at the rotation input device is deactivated (e.g. the user interface 50 stops interpreting rotation of the dial 44 as a rotation instruction for re-orientation and reverts to navigation). Processing may pass form step S2b to step S1b to allow the user 62 to re-start the re-orientation process or to navigate away from the re-orientation facility.

If, on the other hand, it is determined at step S2 that a rotation instruction has been received, processing proceeds through steps S3 to S7 as described with reference to FIG. 9.

In some embodiments, a re-orientated position of the user interface 50 (e.g. after in-place rotation and/or cycling of corner elements through corner portions of the display 42) may be saved. For example, after the processing of step S7 in FIG. 9 or 10, a new orientation may be automatically stored in the storage 1c. In some embodiments, the user 62 may be provided with an option as to whether or not to save the current orientation. For example, an option to save the updated orientation may be provided in the central element 52. By saving the updated orientation, the new orientation may be utilised even after a power cycle of the labelling machine 1 and/or controller 40, without requiring an additional re-orientation operation.

In the example embodiments depicted in the Figures, each of the central element 52 and the corner elements 54-60 are depicted with a circular outline. It will be appreciated however that this merely provided to aid clarity of description and that such an outline is not a necessary feature of the invention. It will further be understood, however, that where an outline is provided for one or more of the elements 52-60, the outline preferably has a high order of rotational symmetry. In this regard, a circle may be preferable, although other shapes with high orders of rotational symmetry may also be used.

It will further be understood that while an example embodiment in which four corner elements is described above, other embodiments in which there are fewer corner elements (e.g. one or more), or more corner elements (e.g. with a non-rectangular display) are also possible.

It will be apparent from the foregoing description that the various features described can be used alongside one another in a single labelling machine. That is, unless the context otherwise requires, or unless explicitly stated to the contrary herein, it is envisaged that the features described can advantageously be used in a single labelling machine to realise the various benefits described herein. That said, it will also be appreciated that many of the features described herein can be used separately of one another and as such a labelling machine including one or more (but not necessarily all) of the features described herein is envisaged.

Various features of the labelling machine have been described above. In some cases, exemplary components, configurations and methods suitable for realising these particular features have been described. However in many cases the skilled person will know of other components, configurations and methods which can similarly be used to realise the particular features which are described. Many of these components, configurations and methods will be known to the skilled person from the common general knowledge. It is envisaged that such alternative components, configurations and methods can be implemented in the described embodiments without difficulty given the disclosure presented herein.

While references have been made herein to a controller or controllers it will be appreciated that control functionality described herein can be provided by one or more controllers. Such controllers can take any suitable form. For example control may be provided by one or more appropriately programmed microprocessors (having associated storage for program code, such storage including volatile and/or non volatile storage). Alternatively or additionally control may be provided by other control hardware such as, but not limited to, application specific integrated circuits (ASICs) and/or one or more appropriately configured field programmable gate arrays (FPGAs).

Where angles have been specified herein, such angles are measured in degrees although modifications to use other angular measurements will be apparent to the skilled person.

While various embodiments of labelling machine(s) have been described herein, it will be appreciated that this description is in all respects illustrative, not restrictive. Various modifications will be apparent to the skilled person without departing from the spirit and scope of the invention.

The invention claimed is:

1. An apparatus, comprising:
   a first housing suitable for positioning at any one of a plurality orientations, said first housing being a component of an industrial labelling machine or an industrial printer;
   a display of a second housing, said second housing mounted to the first housing; and
   a processor arranged to execute instructions stored in a memory, the instructions being arranged to:
   cause a user interface to be displayed on the display, the user interface comprising at least one corner element, the at least one corner element positioned at one of a plurality of corner portions of the display and having a centre point,
   receive an indication of a rotation amount and rotation direction from a rotation input,
   rotate the at least one corner element about the centre point by the rotation amount in the rotation direction, and
   if the rotation amount is greater than a first predetermined limit, move the at least one corner element to a different one of the plurality of corner portions of the display.

2. The apparatus of claim 1, wherein moving the at least one corner element comprises moving the at least one corner element by a single corner portion in the rotation direction.

3. The apparatus of claim 1, wherein the instructions are further arranged to, if the rotation amount is greater than a second predetermined limit, move the at least one corner element by two corner portions in the rotation direction.

4. The apparatus of claim 3, wherein the second predetermined limit is greater than the first predetermined limit in the rotation direction.

5. The apparatus of claim 4, wherein the instructions are further arranged to, if the rotation amount is greater than a third predetermined limit move the at least one corner element by three corner portions in the rotation direction.

6. The apparatus of claim 5, wherein the third predetermined limit is greater than the first predetermined limit in the rotation direction.

7. The apparatus of claim 5, wherein the third predetermined limit is greater than the second predetermined limit in the rotation direction.

8. The apparatus of claim 5, wherein the instructions are further arranged to, if the rotation amount is greater than a fourth predetermined limit, determine that the at least one corner element is to remain at its current corner portion.

9. The apparatus of claim 8, wherein the fourth predetermined limit is greater than the first predetermined limit in the rotation direction.

10. The apparatus of claim 8, wherein the fourth predetermined limit is greater than the third predetermined limit in the rotation direction.

11. The apparatus of claim 8, wherein the fourth predetermined limit is greater than the second predetermined limit.

12. The apparatus of claim 1, wherein the user interface comprises first to fourth corner elements each positioned in a respective one of first to fourth corner portions of the display; and
    wherein the instructions are arranged to, if the rotation amount is greater than a first predetermined limit, move each of the first to fourth corner elements to a different respective one of the first to fourth corner portions of the display.

13. The apparatus of claim 12, wherein the instructions are arranged to, if the rotation amount is greater than the first predetermined limit, move each of the first to fourth corner elements by a single corner portion in the rotation direction, if the rotation amount is greater than a second predetermined limit, move each of the first to fourth corner elements by two corner portions in the rotation direction, if the rotation amount is greater than a third predetermined limit, move each of the first to fourth corner elements by three corner portions in the rotation direction, and if the rotation amount is greater than a fourth predetermined limit, determine that each of the first to fourth corner element is to remain at the current respective corner portions.

14. The apparatus of claim 1, wherein the rotation input comprises a dial for providing the indication of a rotation amount and direction.

15. The apparatus of claim 1, wherein the instructions are further arranged to determine whether selection of a re-orientation facility has been received and to prevent re-orientation of the user interface until a selection of the re-orientation facility has been received.

16. The apparatus of claim 14, wherein the dial is a rotatable dial and comprises a knob to facilitate rotation of the dial by a user and wherein a direction of rotation of the knob provides the rotation direction of the rotation input and wherein an extent of rotation of the knob provides the rotation amount of the rotation input.

17. The apparatus of claim 1, where the first housing comprises a supply spool support and a take up spool support wherein label stock is configured to extend from the supply spool support to the take up spool support.

18. The apparatus of claim 1, wherein the user interface further comprises a central element positioned in a central portion of the display, wherein the instructions are arranged to rotate the central element about a central element centre point by the rotation amount in the rotation direction.

19. The apparatus of claim 18, wherein the central element remains at substantially the same position on the display irrespective of the positions of the corner elements.

20. A method for re-orientating a user interface comprising at least one corner element, the at least one corner element having a centre point and positioned in one of a plurality of corner portions of a display with a second housing, said second housing mounted to a first housing that is a component of an industrial printer or industrial labelling machine, the method comprising:
  receiving an indication of a rotation amount and rotation direction from a rotation input;
  rotating the at least one corner element about the centre point by the rotation amount in the rotation direction; and
  if the rotation amount is greater than a first predetermined limit, moving the at least one corner element to a different one of the plurality of corner portions of the display.

* * * * *